(12) United States Patent
Puura et al.

(10) Patent No.: US 8,788,369 B2
(45) Date of Patent: Jul. 22, 2014

(54) METHOD AND APPARATUS FOR PROVIDING ASYNCHRONOUS PAYMENT PROCESSING

(75) Inventors: Sami Mikael Puura, Helsinki (FI); Jarmo Juhani Taipale, Helsinki (FI)

(73) Assignee: Nokia Corporation, Espoo (FI)

( * ) Notice: Subject to any disclaimer, the term of this patent is extended or adjusted under 35 U.S.C. 154(b) by 315 days.

(21) Appl. No.: 13/072,414

(22) Filed: Mar. 25, 2011

(65) Prior Publication Data
US 2012/0221435 A1   Aug. 30, 2012

Related U.S. Application Data

(60) Provisional application No. 61/446,640, filed on Feb. 25, 2011.

(51) Int. Cl.
G06Q 30/00 (2012.01)
G06Q 20/32 (2012.01)
G06Q 20/40 (2012.01)
G06Q 10/08 (2012.01)
G06Q 30/06 (2012.01)
G06Q 20/02 (2012.01)

(52) U.S. Cl.
CPC ............ *G06Q 20/3224* (2013.01); *G06Q 20/40* (2013.01); *G06Q 10/0831* (2013.01); *G06Q 30/0637* (2013.01); *G06Q 20/02* (2013.01); *G06Q 30/06* (2013.01); *G06Q 10/087* (2013.01)
USPC .................. 705/26.82; 705/26.81; 705/26.41; 705/26.35; 705/26.1; 705/44; 705/67; 455/406; 455/408; 455/558

(58) Field of Classification Search
CPC ... G06Q 10/0831; G06Q 10/07; G06Q 20/02; G06Q 20/0855; G06Q 20/3224; G06Q 20/40; G06Q 30/0224; G06Q 30/0025; G06Q 30/0637; G06Q 30/06

USPC .......... 705/26.35, 26.81, 26.1, 26.41, 44, 67, 705/26.82; 455/406, 408, 558
See application file for complete search history.

(56) References Cited

U.S. PATENT DOCUMENTS 7,499,875 B1 *   3/2009   May et al. .................... 705/26.3
2003/0232616 A1   12/2003   Gidron et al.
(Continued)

FOREIGN PATENT DOCUMENTS

WO   WO 2008042820 A2   4/2008
WO   WO 2009097130 A1   8/2009

OTHER PUBLICATIONS

International Search Report for PCT/FI2012/050165 dated May 24, 2012, pp. 1-6.
(Continued)

*Primary Examiner* — Yogesh C Garg
(74) *Attorney, Agent, or Firm* — Ditthavong & Steiner, P.C.

(57) ABSTRACT

An approach is provided for processing transaction payments. The transaction engine receives payment information, from a device, for completing a transaction between a first party and a second party, wherein the payment information is for requesting, at least in part, a payment approval from at least one payment service provider. Next, the transaction engine determines historical transaction data associated with one or more previous transactions between the first party and the second party. Then, the transaction engine processes and/or facilitates a processing of the historical transaction data to determine whether to initiate a delivery of at least one item associated with the transaction prior to receiving a confirmation of the payment approval from the at least one payment service provider.

20 Claims, 9 Drawing Sheets

(56) References Cited

U.S. PATENT DOCUMENTS

| | | |
|---|---|---|
| 2005/0234833 A1 | 10/2005 | VanFleet et al. |
| 2006/0206412 A1 | 9/2006 | Luchene et al. |
| 2008/0059329 A1* | 3/2008 | Luchene et al. ............... 705/26 |
| 2010/0223127 A1* | 9/2010 | Bettez et al. ............. 705/14.51 |
| 2011/0022517 A1* | 1/2011 | Hammad ...................... 705/44 |

OTHER PUBLICATIONS

International Written opinion for PCT/FI2012/050165 dated May 24, 2012, pp. 1-9.

* cited by examiner

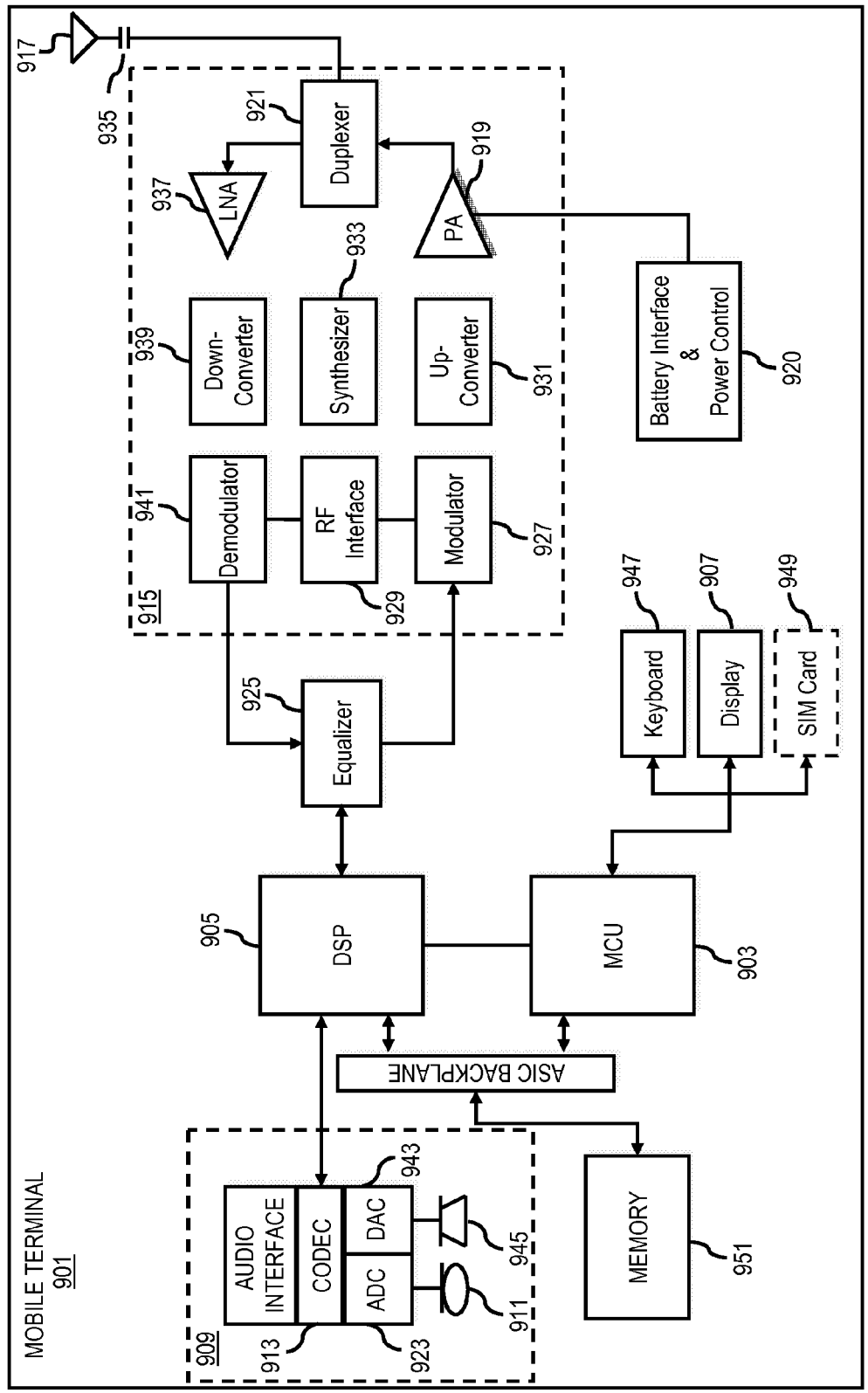

METHOD AND APPARATUS FOR PROVIDING ASYNCHRONOUS PAYMENT PROCESSING

RELATED APPLICATIONS

This application claims the benefit of the earlier filing date under 35 U.S.C. §119(e) of U.S. Provisional Application Ser. No. 61/446,640 filed Feb. 25, 2011, entitled "Method and Apparatus for Providing Asynchronous Payment Processing," the entirety of which is incorporated herein by reference.

BACKGROUND

Service providers and device manufacturers (e.g., wireless, cellular, etc.) are continually challenged to deliver value and convenience to consumers by, for example, providing compelling network services. In recent years, technological advances have enabled commercial entities to operate commercial transactions more efficiently. The improvement in efficiency for these commercial transactions may be attributed to enhanced payment processing. For example, online vendors, auctions sites, financial institutions, and many other commercial users now have access to payment processing services that offer faster payment approvals, upgraded security, and improved fraud prevention. However, even with such advances, the amount of time necessary to determine whether a payment for a particular transaction is approved may still cause a significant delay. As a result, commercial entities utilizing such payment processing may experience slower commercial transactions. Consumers faced with these transaction delays may experience frustration or dissatisfaction with their purchases, and thus, may opt to purchases their goods and services in the future from somewhere else.

SOME EXAMPLE EMBODIMENTS

Therefore, there is a need for an approach for effectively providing asynchronous payment processing.

According to one embodiment, a method comprises receiving payment information, from a device, for completing a transaction between a first party and a second party, wherein the payment information is for requesting, at least in part, a payment approval from at least one payment service provider. The method also comprises determining historical transaction data associated with one or more previous transactions between the first party and the second party. The method further comprises processing and/or facilitating a processing of the historical transaction data to determine whether to initiate a delivery of at least one item associated with the transaction prior to receiving a confirmation of the payment approval from the at least one payment service provider.

According to another embodiment, an apparatus comprises at least one processor, and at least one memory including computer program code, the at least one memory and the computer program code configured to, with the at least one processor, cause, at least in part, the apparatus to receive payment information, from a device, for completing a transaction between a first party and a second party, wherein the payment information is for requesting, at least in part, a payment approval from at least one payment service provider. The apparatus is also caused to determine historical transaction data associated with one or more previous transactions between the first party and the second party. The apparatus is further caused to process and/or facilitate a processing of the historical transaction data to determine whether to initiate a delivery of at least one item associated with the transaction prior to receiving a confirmation of the payment approval from the at least one payment service provider.

According to another embodiment, a computer-readable storage medium carries one or more sequences of one or more instructions which, when executed by one or more processors, cause, at least in part, an apparatus to receive payment information, from a device, for completing a transaction between a first party and a second party, wherein the payment information is for requesting, at least in part, a payment approval from at least one payment service provider. The apparatus is also caused to determine historical transaction data associated with one or more previous transactions between the first party and the second party. The apparatus is further caused to process and/or facilitate a processing of the historical transaction data to determine whether to initiate a delivery of at least one item associated with the transaction prior to receiving a confirmation of the payment approval from the at least one payment service provider.

According to another embodiment, an apparatus comprises means for receiving payment information, from a device, for completing a transaction between a first party and a second party, wherein the payment information is for requesting, at least in part, a payment approval from at least one payment service provider. The apparatus also comprises means for determining historical transaction data associated with one or more previous transactions between the first party and the second party. The apparatus further comprises means for processing and/or facilitating a processing of the historical transaction data to determine whether to initiate a delivery of at least one item associated with the transaction prior to receiving a confirmation of the payment approval from the at least one payment service provider.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 9 is a diagram of a mobile terminal (e.g., handset) that can be used to implement an embodiment of the invention.

DESCRIPTION OF SOME EMBODIMENTS

Examples of a method, apparatus, and computer program for providing asynchronous payment processing are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "payment" may refer to the transfer of wealth from one party to another party. The term "party" may refer to a person, an account, a store, an organization, a company, etc. The term "wealth" may refer to anything that can be of value.

Figure 1:
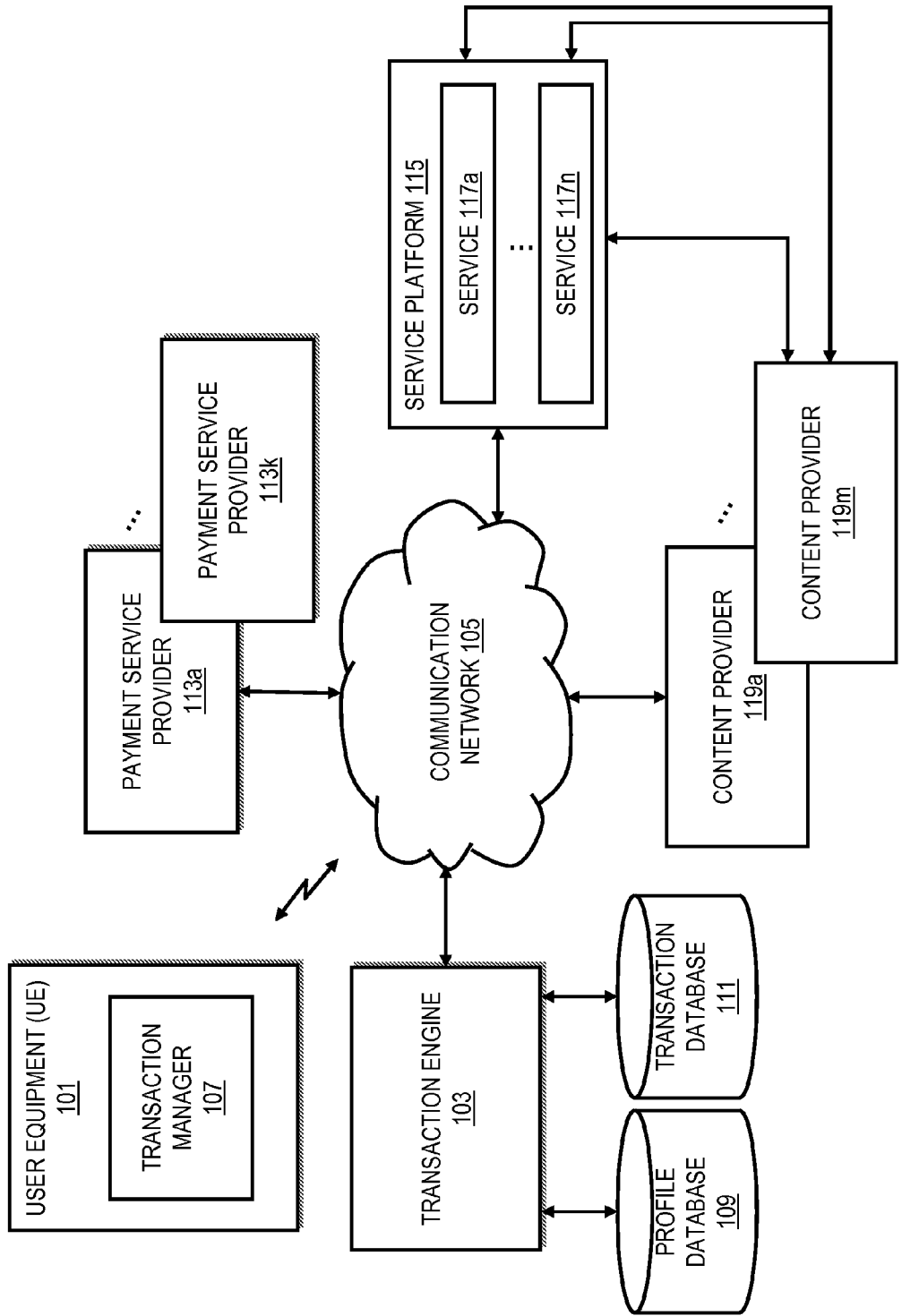
FIG. 1 is a diagram of a system capable of providing asynchronous payment processing, according to one embodiment.

FIG. 1 is a diagram of a system capable of providing asynchronous payment processing, according to one embodiment. As discussed, recent technological advances have increasing made commercial transaction easier and safer for both buyers and sellers of goods and services. For example, online vendors, auction sites, financial institutions, and many other commercial users now have access to payment processing services that offer faster payment approvals, upgraded security, and improved fraud prevention. Sellers of goods and services are able to profit from smoother operations and quicker transactions resulting from such payment processing enhancements. At the same time, buyers of goods and services are able to benefit in the form of a better user experience. However, even with such advances, the amount of time necessary to determine whether a payment for a particular transaction is approved may still be a significant delay for consumers. A credit card or operator billing payment, for instance, may take at least 10 seconds before a payment service provider is able to determine whether the payment should be approved. In many cases, the payment approval process may even take up to 72 hours before an "approved" or a "deny" status is determined. Buyers faced with these transaction delays may experience frustration or dissatisfaction with their purchases, and thus, may opt to purchases their goods and services in the future through another seller.

Although some payment processing services may provide buyers with the transaction item (e.g., goods, services, etc.) without waiting for the buyer's payment information to be verified to reduce transaction delay, such decisions may create opportunities for fraud. By way of example, buyers may intentionally provide inaccurate payment information (e.g., unauthorized user, expired credit card, etc.) to access downloadable content from sellers. Because the downloadable content will be released to these buyers without first verifying the payment information, the sellers may thus be left without any payment for their downloadable content. As a result, the sellers may be less inclined to offer their goods and services, especially if the costs incurred from fraud are significant.

To address this problem, a system 100 of FIG. 1 introduces the capability to asynchronously process payments based on historical transaction data. Specifically, the system 100 may check one or more previous transactions between a first party and a second to decide whether to release an item, for instance, to one of the parties without first verifying that party's payment information or wait until that party's payment information is verified before releasing the item to that party. By way of example, the system 100 may receive payment information provided by a buyer, via a device, in order to purchase one or more items from a seller. The items may either be goods or services provided by the seller. Before verification of the payment information is completed, the system 100 may check a transaction history between the buyer and the seller. The transaction history may include positive payment information, negative payment information, or other transaction data. For example, positive payment information may include a successful status of one or more previous payment approval requests, a positive rating of the buyer by the seller for one or more previous payments, etc. Negative payment information may include a failed status of one or more previous payment approval requests, a waiting status of one or more previous payment approval requests, etc. Based on the transaction history, the system 100 may determine whether to deliver the seller's item to the buyer before the verification of the payment information is completed (e.g., receipt of a confirmation of payment approval). It is noted that transaction histories between the buyer and other sellers may also be utilized to determine whether to deliver the seller's item to the buyer before the verification of the payment information is completed.

In one sample use case, the transaction history between a buyer and a seller may contain negative payment information. As such, when the buyer provides the payment information to purchase the seller's item, the delivery of the item to the buyer may be placed on hold until a payment approval is received, for instance, pursuant to a verification process. However, the decision of whether to hold the delivery of the item until the payment approval is received may also be based on other factors, such as the age of the negative payment information, the amount of negative payment information, etc. As an example, the seller's item may be delivered to the buyer before a payment approval based on the payment information is received where the transaction history contains successful statuses associated with many previous payment approval requests and a failed status on only one previous payment approval request. In another example, the delivery of the seller's item may be placed on hold until the payment approval is received where the transaction history contains successful statuses associated with many previous payment approvals, but a failed status on a recent payment approval request.

In another sample use case, there may be no transaction history between the buyer and the seller. In this situation, buyer may initially be given a "trusted" status such that the seller's item is delivered to the buyer before a payment approval based on the payment information is received. However, the buyer may also be given an "untrusted" status such that the delivery of the seller's item is placed on hold until the payment approval is received. In yet another sample use case, although there may no transaction history between the buyer and the seller, it may be determined that transaction histories between the buyer and other sellers exist. In this situation, the transaction histories between the buyer and the other sellers may be utilized to determine whether to deliver the seller's item to the buyer before the payment approval is received. For example, the seller's item may be delivered to the buyer before the payment approval is received where the buyer does not have a transaction history with the seller, but the buyer has transaction histories, which contain no negative payment information, with the other sellers.

In certain embodiments, an advertisement, a recommendation, related information, etc., may be presented to one of the parties while the determination of whether to deliver the item, for instance, to that party is pending, while the receipt of a confirmation of a payment approval based on the payment information is pending, etc. By way of example, an advertisement for an upcoming movie may be presented to a buyer, via the buyer's user device, where the buyer has provided payment information to purchase a seller's downloadable movie. The movie advertisement may also be related to the downloadable movie by genre, ratings by similar buyers, or any other relationship. In this way, the party waiting for the delivery of the item (e.g., the buyer) may be entertained (e.g., short movie trailer) or occupied during the waiting process. At the same time, additional revenue may be earned by presenting the advertisement, the recommendation, the related information, etc.

In certain other embodiments, a time duration associated with the determination of whether to deliver the item prior to payment approval, the receipt of the payment approval, etc., may be determined to exceed a predetermined threshold. As such, the transaction between the buyer and the seller, one or more subsequent transactions, etc., may be modified to include discount information, one or more payment credits, etc., in profile information associated with the buyer, the seller, etc. In one example, the seller's profile may be modified such that the buyer will receive a discount (e.g., 10% off, 10 units off, etc.) for the next item that the buyer purchases from the seller. In another example, the buyer's profile may be modified such that buyer's profile may be supplemented with additional payment credits that may be used to purchase items in any subsequent transactions.

In particular embodiments, the determination to deliver the item before the payment approval is received may be based on a payment type associated with the payment information, characteristics associated with the payment type, etc. Payment types may, for instance, include credit cards, operator billing, paper or electronic checks, bank transfers, prepaid cards or vouchers, cash payments, online wallets, or any other payment type. Characteristics associated with the payment type may include an approval processing speed, a rate of fraud, or any other characteristics. In one sample use case, the approval processing speed for credit card payments may be determined to be faster than other payment types. Thus, it may be more beneficial to prevent non-payment (e.g., due to fraud or mistake by a buyer) by holding the delivery of a seller's item to a buyer until the payment approval is received as opposed to risking non-payment by releasing the item earlier where the buyer used the buyer's credit card information to pay for the item. In another sample use case, the approval processing speed for operator billing payments may be slower than other payment types. As such, it may be more beneficial to release the item to the buyer before the payment approval is received to avoid frustrating an impatient buyer. In a further sample use case, the rate of fraud for prepaid vouchers payments (e.g., payment credits provided by the system 100) may be determined to be very low. As such, the item may be released to the buyer prior to the payment approval being received where the buyer paid for the item with a prepaid voucher.

In particular other embodiments, the determination to deliver the item before the payment approval is received may be based on context information associated with the device used to provide the payment information, the transaction, the buyer, the seller, etc. Context information may, for instance, include time, location, activity, etc. By way of example, if the device from which the payment information is provided is currently located in a country where fraudulent activities are very high, the delivery of the item to the buyer may be placed on hold until the payment approval is received. However, if the buyer's profile information as well as other information demonstrates that the buyer is from a country where fraudulent activities are very low, the item may be released to buyer before the payment approval is received. By way of another example, if the transaction is located in an area where approval processing speed is slow, the item may be released before the payment approval is received to avoid frustrating an impatient buyer.

More specifically, the system 100 may receive payment information, from a device, for completing a transaction between a first party and a second party, wherein the payment information is for requesting, at least in part, a payment approval from at least one payment service provider. The system 100 may then determine historical transaction data associated with one or more previous transactions between the first party and the second party. As discussed, it may be determined that the historical transaction data include positive payment information, negative payment information, or other transaction data. It may also be determined that there is no historical transaction data between the first party and the second party. The system 100 may further process and/or facilitate a processing of the historical transaction data to determine whether to initiate a delivery of at least one item associated with the transaction prior to receiving a confirmation of the payment approval from the at least one payment service provider. As provided, the determination of whether to initiate the delivery prior to receiving the confirmation of the payment approval may be based on the historical transaction data, such as the positive payment information, negative payment information, or other transaction data, or on the fact that there is currently no historical transaction data between the first party and the second party.

As shown in FIG. 1, the system 100 comprises a user equipment (UE) 101 (or multiple UEs 101) having connectivity to a transaction engine 103 via a communication network 105. The UE 101 may include or have access to a transaction manager 107 to enable to the UE 101 to interact with the transaction engine 103. The transaction engine 103 may include or have access to a profile database 109 and a transaction database 111. By way of example, the transaction engine 103 may utilize the profile database 109 to determine profile information associated with users, the UE 101, payment service providers 113 (or payment service providers 113a-113k), service platform 115, services 117 (or services 117a-117n), content providers 119 (or content providers 119a-119m), etc. The transaction engine 103 may also utilize the transaction database 111 to determine historical transaction data associated with the profile information. The UE 101 (e.g., via the transaction manager 107), the payment service providers 113, the service platform 115, the content providers 119, or other components of the system 100 may also utilize the profile database 109 and the transaction database 111, for instance, to determine their profile information or their historical transaction data.

In certain embodiments, items available for transactions may be provided by the service platform 115, the one or more services 117 of the service platform 115, the one or more content providers 119, and/or another other services available over the communication network 105. For example, a particular service 117 (e.g., a music or video service) may obtain content (e.g., media content) from a particular content provider 119 to offer the content to the UE 101.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the transaction engine 103 may determine that there is negative payment information in the historical transaction data. The negative payment may include, for instance, a failed status of one or more previous payment approval requests, a waiting status of one or more previous payment approval requests, etc. For example, in a transaction between a buyer and a seller, the negative payment information may indicate to the transaction engine 103 that the buyer, who is associated with the payment information, should not be trusted. It may have been determined, for instance, in previous transactions between the buyer and the seller, that the buyer provided false payment information, inaccurate payment information, expired payment information (e.g., expired credit card), etc., resulting in a failed or waiting status for the associated previous payment approval request. As such, the transaction engine 103 may then determine to hold the delivery of the item until the confirmation of the payment approval is received from the payment service provider 113.

In a further embodiment, the transaction engine 103 may determine an age of the negative payment information, wherein the determination of whether to hold to the delivery of the item until the confirmation of the payment approval is received is based on the age of the negative payment information. As an example, the transaction engine 103 may initiate a delivery of the item prior to receiving the confirmation of the payment approval where the negative payment information contains only a failed status associated with an old payment approval request (e.g., submitted over a year ago). As another example, the transaction engine 103 may determine to hold the delivery of the item until the confirmation of the payment approval is received where the negative payment information contains a waiting status associated with a recent payment approval request (e.g., submitted the day before).

In another embodiment, the transaction engine 103 may determine that there is no historical transaction data between the first party and the second party. As such, the transaction engine 103 may initiate the delivery of the item prior to receiving the confirmation of the payment approval. In this way, the transaction engine 103 gives the party receiving the item a "trusted" status where the receiving party has not yet provided a reason that it should not be trusted.

In another embodiment, the transaction engine 103 may present one or more advertisements, one or more recommendations, related information, etc., pending the determination of whether to initiate the delivery of the item, the receiving of the confirmation of the payment approval, etc. In one sample use case, the transaction engine 103 may recommend other items related to the item (e.g., an application) that a buyer attempts to purchase. As such, the transaction engine 103 may present recommendations of such related items (e.g., similar applications, items bought by similar buyers, etc.) to the buyer while the transaction engine 103 is, for instance, determining whether to initiate the delivery of the item prior to receiving the confirmation of the payment approval. In this way, as explained, the party waiting for the delivery of the item (e.g., the buyer) may be entertained or occupied during the waiting process. At the same time, additional revenue may be earned by presenting the advertisement, the recommendation, the related information, etc.

In another embodiment, the transaction engine 103 may determine a time duration associated with the determination of whether to initiate the delivery of the item, the receiving of the confirmation of the payment approval, etc. If the transaction engine 103 determines that the time duration exceeds a predetermined threshold (e.g., 10 seconds, longest time duration associated with the lower 95th percentile of cases with a particular payment method, etc.), the transaction engine 103 may modify the transaction between the first party and the second party, one or more subsequent transactions, etc., to include discount information, one or more payment credits, etc., in profile information associated with the first party, the second party, etc. As discussed, in the buyer and seller example above, the seller's profile may be modified such that the buyer will receive a discount for the next item that the buyer purchases from the seller. Moreover, the buyer's profile may be modified such that buyer's profile is supplemented with additional payment credits that may be used to purchase items in any future transactions.

In another embodiment, the transaction engine 103 may process the payment information to determine one or more payments types, wherein the delivery of the item may be initiated prior to receiving the confirmation of the payment approval based on the one or more payment types, one or more characteristics associated with the one or more payment types, etc. For example, the one or more payment types may include credit cards, operator billing, paper or electronic checks, bank transfers, prepaid cards or vouchers, cash payments, online wallets, or any other payment type. The one or more characteristics associated with the payment type may include an approval processing speed, a rate of fraud, or any other characteristics. As mentioned, the one or more payment types and/or the one or more characteristics may be factors to be utilized in determining whether it would be more beneficial to release the item early or to hold the delivery of the item until the confirmation of the payment approval is received.

In another embodiment, the transaction engine 103 may determine context information associated with the device, the transaction, the first party, the second party, etc., wherein the delivery of the item may be initiated prior to receiving the confirmation of the payment approval based on the context information. Context information may, for instance, include time, location, activity, etc. As explained, such context information may be factors to be utilized in determining the costs and benefits (e.g., avoiding fraud, but risk frustrating credible buyers) associated with releasing the item to the buyer early or to hold the delivery of the item until the confirmation of the payment approval is received.

By way of example, the UE 101, the transaction engine 103, the payment service providers 113, the service platform 115, and the content providers 119 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
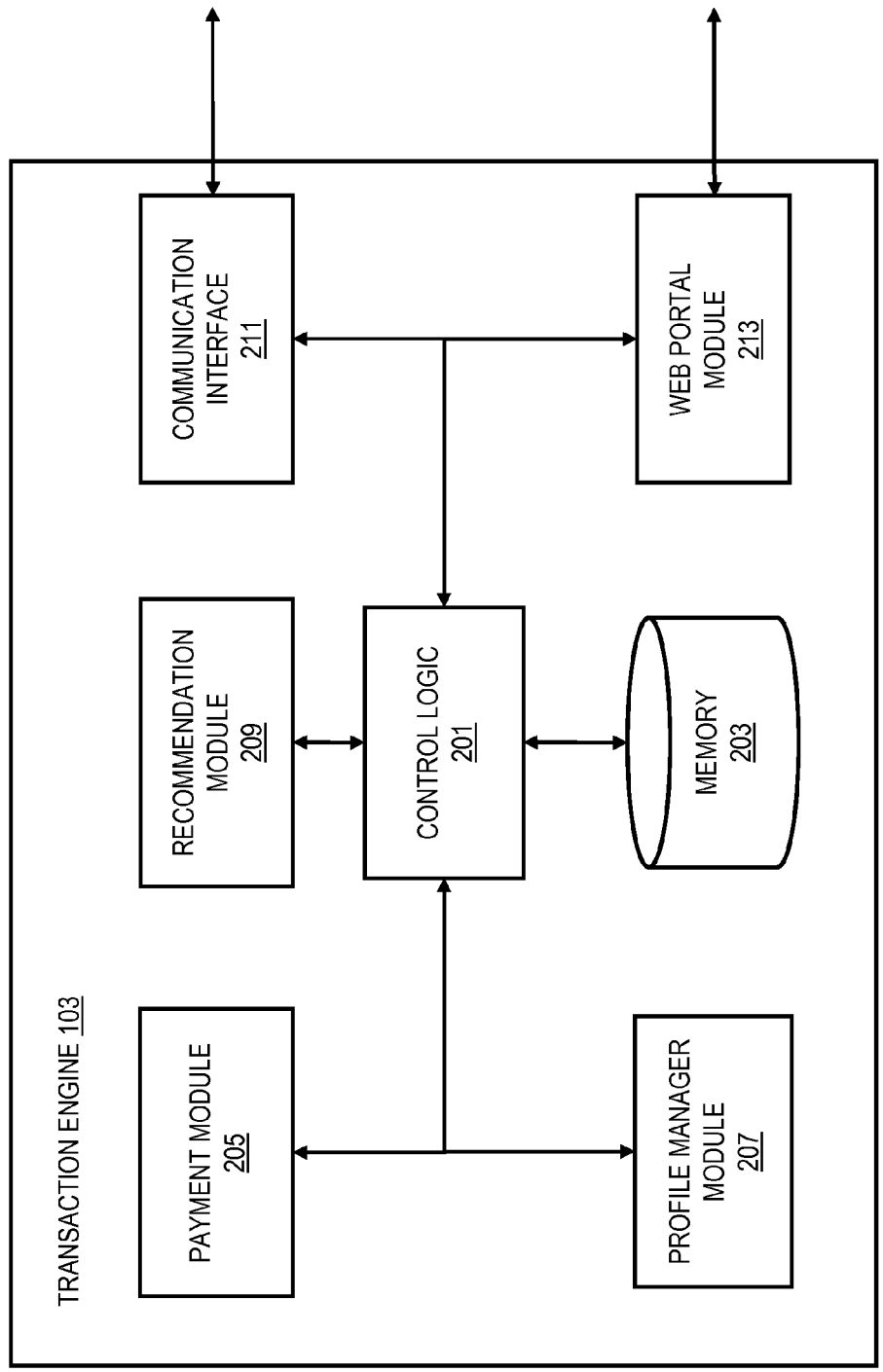
FIG. 2 is a diagram of the components of a transaction engine, according to one embodiment.

FIG. 2 is a diagram of the components of a transaction engine, according to one embodiment. By way of example, the transaction engine 103 includes one or more components for providing asynchronous payment processing. It is contemplated that the functions of these components may be combined in one or more components or performed by other components of equivalent functionality. In this embodiment, the transaction engine 103 includes control logic 201, memory 203, a payment module 205, a profile manager module 207, a recommendation module 209, a communication interface 211, and a web portal module 213.

The control logic 201 executes at least one algorithm for executing functions of the transaction engine 103. For example, the control logic 201 interacts with the payment module 205 to receive payment information, from a device, for completing a transaction between a first party and a second party, wherein the payment information is for requesting a payment approval from a payment service provider 113. As such, the payment module 205 may also transmit a payment approval request to the payment service provider 113 based on the payment information.

Next, the control logic 201 directs the profile manager module 207 to determine historical transaction data associated with one or more previous transactions between the first party and the second party. In doing so, the profile manager module 207 may access the profile database 109 to obtain the profile information for the first party and the second party. Using the profile information, the profile manager module 207 may access the transaction database 111 to gather historical transaction data associated with the one or more previous transactions between the first party and the second party based on the profile information. If the profile manager module 207 determines that there is no historical transaction data between the first party and the second party, the profile manager module 207 may, for instance, indicate that the item may be delivered without waiting for a confirmation of the payment approval to be received from the payment service provider 113. If such historical transaction data exists, the profile manager module 207 may also process the historical transaction data to determine whether to initiate a delivery of the item associated with the transaction prior to receiving the confirmation of the payment approval. In making such a determination, the profile manager module 207 may check to see whether there is positive payment information, negative payment information, etc., in the historical transaction data. By way of example, the profile manager module 207 may indicate that the delivery of the item should be placed on hold until the confirmation of the payment approval is received where there is negative payment information in the historical transaction data.

Then, the control logic 201 works with the recommendation module 209 to present one or more advertisements, one or more recommendations, related information, etc., pending the determination of whether to initiate the delivery of the item, the receiving of the confirmation of the payment approval, etc. Moreover, if the recommendation module 209 determines that a time duration associated with the determination of whether to initiate the delivery of the item, the receiving of the confirmation of the payment approval, etc., exceeds a predetermined threshold, the recommendation module 209 may modify the transaction, one or more subsequent transactions, etc., to include discount information, one or more payment credits, etc., in profile information associated with the first party, the second party, etc. To do so, the recommendation module 209 may interact with the profile manager module 207 to access the profile information in the profile database 109.

The control logic 201 also utilizes the communication interface 211 to communicate with other components of the transaction engine 103, the UEs 101, the profile database 109, the transaction database 111, the payment service providers 113, the service platform 115, the content providers 119, and other components of the system 100. The communication interface 211 may include multiple means of communication. For example, the communication interface 211 may be able to communicate over SMS, internet protocol, instant messaging, voice sessions (e.g., via a phone network), or other types of communication. The control logic further employs the web portal module 213, for instance, to enable users of the UEs 101, the payment service providers 113, and the content providers 119 to access their profile information and their transaction histories.

Figure 3:
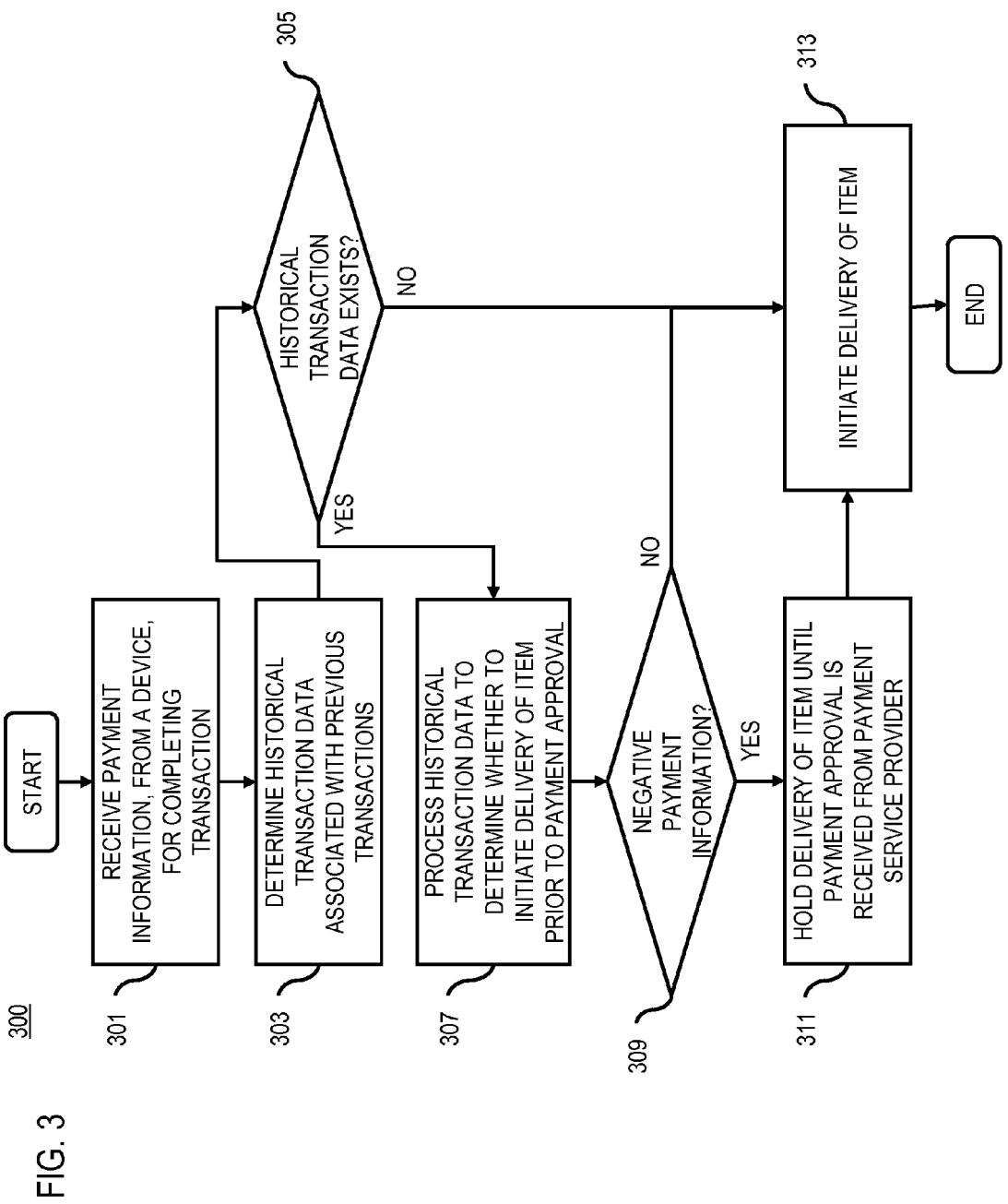
FIG. 3 is a flowchart of a process for providing asynchronous payment processing, according to one embodiment.
Figure 8:
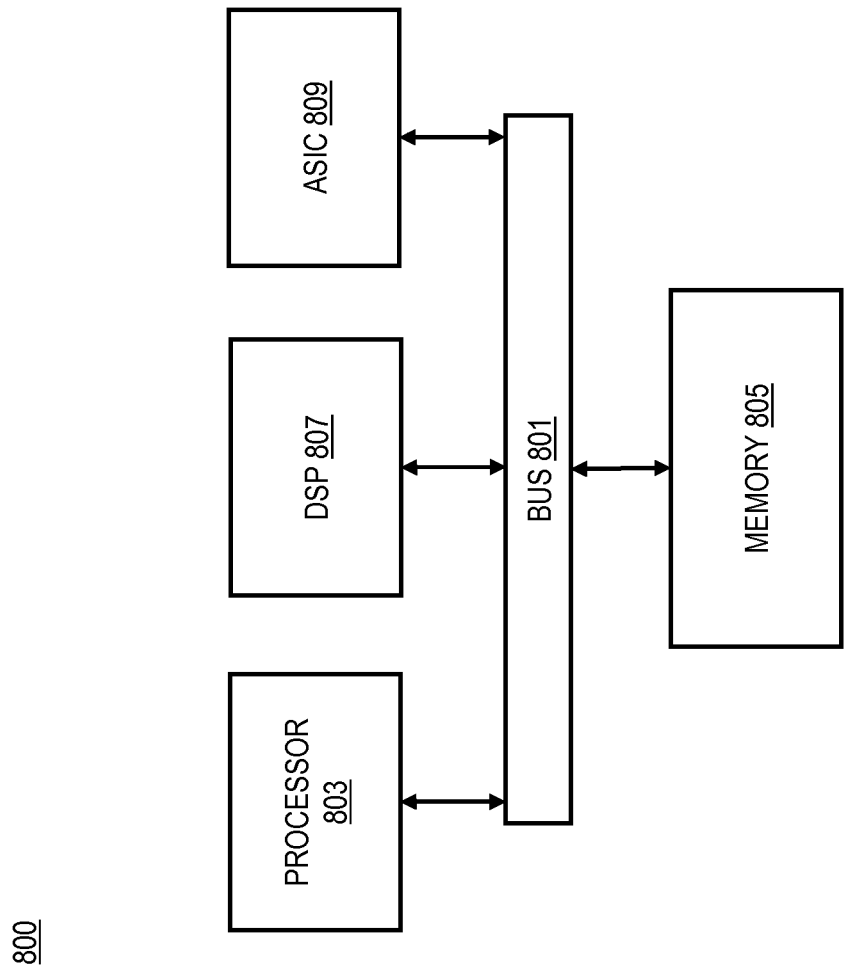
FIG. 8 is a diagram of a chip set that can be used to implement an embodiment of the invention.

FIG. 3 is a flowchart of a process for providing asynchronous payment processing, according to one embodiment. In one embodiment, the transaction engine 103 performs the process 300 and is implemented in, for instance, a chip set including a processor and a memory as shown in FIG. 8. As such, the control logic 201 can provide means for accomplishing various parts of the process 300 as well as means for accomplishing other processes in conjunction with other components of the transaction engine 103.

In step 301, the control logic 201 may receive payment information, from a device, for completing a transaction between a first party and a second party, wherein the payment information is for requesting, at least in part, a payment approval from at least one payment service provider 113. As discussed, the first party may be a buyer and the second party may be a seller. Thus, the buyer may provide the payment information to complete a transaction with the seller.

In step 303, the control logic 201 may determine historical transaction data associated with one or more previous transactions between the first party and the second party. By way of example, the control logic 201 may access, via the profile manager module 207, the profile database 109 and the transaction database 111 to obtain the historical transaction data between the first party and the second party. As such, the control logic 201 is able to determine, as in step 305, whether such historical transaction data between the first party and the second party exists. If such historical transaction data exists, the control logic 201 may, as in step 307, process and/or facilitate a processing of the historical transaction data to determine whether to initiate a delivery of at least one item (e.g., goods, services, etc.) associated with the transaction prior to receiving a confirmation of the payment approval from the at least one payment service provider 113.

While processing the historical transaction data, or in addition to such processing, the control logic 201 may, as in step 309, determine whether there is negative payment information in the historical transaction data. As discussed, negative payment information may include a failed status of one or more previous payment approval requests, a waiting status of the one or more previous payment approval requests, etc. If such negative payment information exists, the control logic 201 may, as in step 311, determine to hold the delivery of the at least one item until the confirmation of the payment approval is received from the at least one payment service provider 113. By way of example, in a transaction between a buyer and a seller, the negative payment information may indicate to the transaction engine 103 that the buyer, who is associated with the payment information, should not be trusted. It may have been determined, for instance, in previous transactions between the buyer and the seller, that the buyer provided false payment information, inaccurate payment information, expired payment information (e.g., expired credit card), etc., resulting in a failed or waiting status for the associated previous payment approval request. If the confirmation of the payment approval is received, the control logic 201 may, as in step 313, release the hold and initiate the delivery of the at least one item.

However, if it was determined, in step 309, that there was no negative payment information in the historical transaction data between the first party and the second party, the control logic 201 may, as in step 313, initiate the delivery of the at least one item prior to receiving the confirmation of the payment approval. Similarly, if it was determined, in step 305, that no historical transaction data between the first party and the second party exists, the control logic 201 may, as in step 313, initiate the delivery prior to receiving the confirmation.

Figure 4:
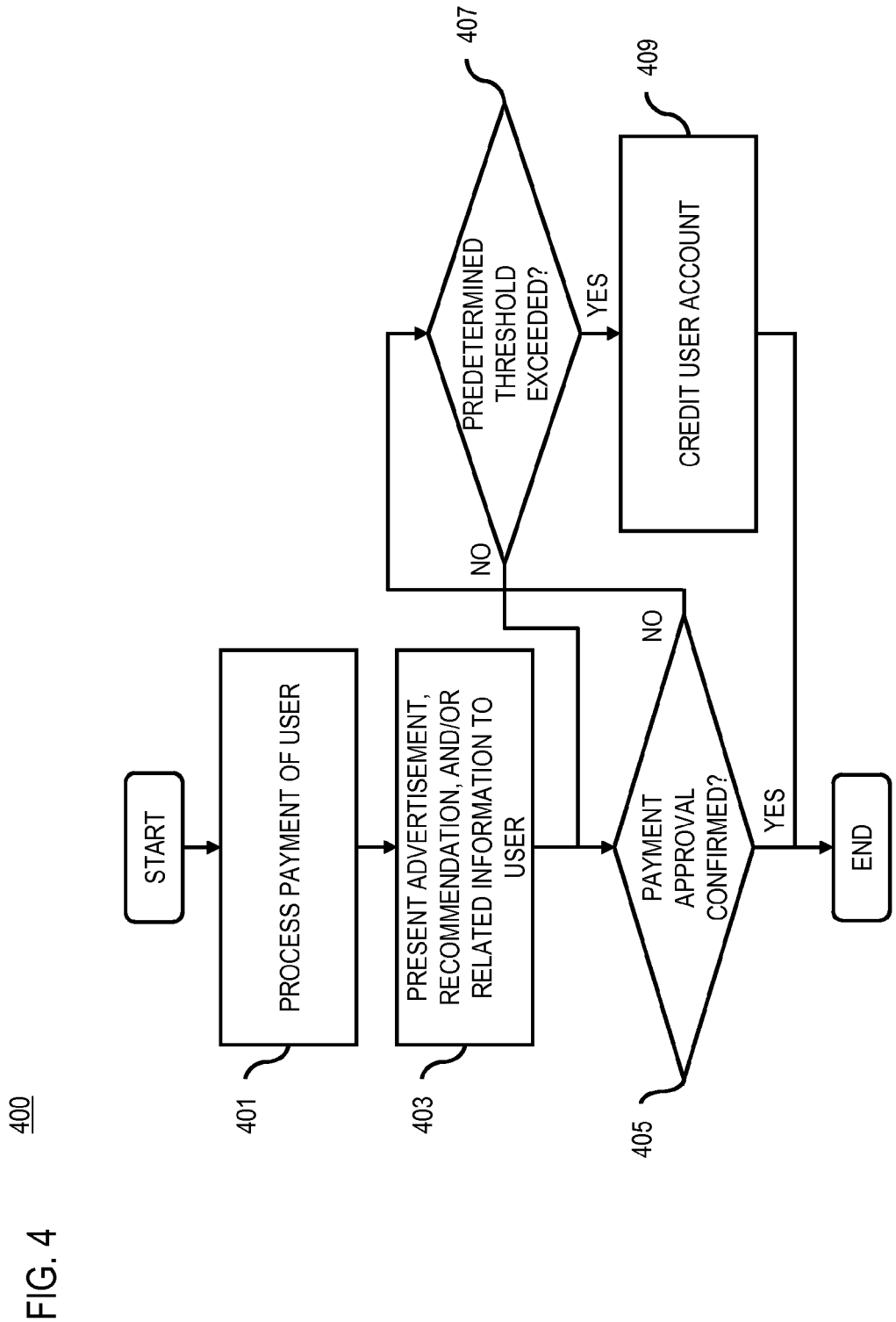
FIG. 4 is a flowchart of a process for presenting content to a user, according to one embodiment.

FIG. 4 is a flowchart of a process for presenting content to a user, according to one embodiment. In one embodiment, the transaction engine 103 performs the process 400 and is implemented in, for instance, a chip set including a processor and a memory as shown in FIG. 8. As such, the control logic 201 can provide means for accomplishing various parts of the process 400 as well as means for accomplishing other processes in conjunction with other components of the transaction engine 103.

In step 401, the control logic 201 may process a payment from, for instance, the user of the UE 101. By way of example, the user may be a buyer trying to purchase an item from a seller. The user may provide payment information, via the UE 101, for completing the transaction with the seller. The payment information may then be transmitted by the transaction manager 107 of the UE 101 to the transaction engine 103 to initiate a request for a payment approval from a payment service provider 113. During this process, the control logic 201 may also determine historical transaction data between the user and the seller. As such, the historical transaction data, if it exists, may be utilized to determine whether to initiate a delivery of the item prior to receiving a confirmation of the payment approval from the payment service provider 113.

Pending the determination of whether to initiate the delivery of the item, the receiving of the confirmation of the payment approval, etc., the control logic 201 may, as in step 403, present one or more advertisements, one or more recommendations, related information, etc., to the user. In this way, as explained, the user may be entertained or occupied while waiting for the delivery of the item. Moreover, additional revenue may be earned by presenting the advertisement, the recommendation, the related information, etc.

As discussed, the control logic 201 may determine a time duration associated with the determination of whether to initiate the delivery of the item, the receiving of the confirmation of the payment approval, etc. In this example, the time duration is associated with the receiving of the confirmation. As such, the control logic 201 checks, in step 405, whether the confirmation of the payment approval has been received. If the confirmation has not been received, the control logic 201 may, as in step 407, determine whether the time duration exceeds a predetermined threshold. If the time duration has exceeded the predetermined threshold, the control logic 201 may modify the transaction, one or more subsequent transactions, etc., to include discount information, one or more payment credits, etc. in profile information associated with the user, the seller, etc. Here, as shown in step 409, the control logic 201 adds the one or more payment credits to the user account. Accordingly, the user may, for instance, utilize the one or more payment credits towards the present transaction with the seller or towards any other transactions in the future.

Figure 5B:
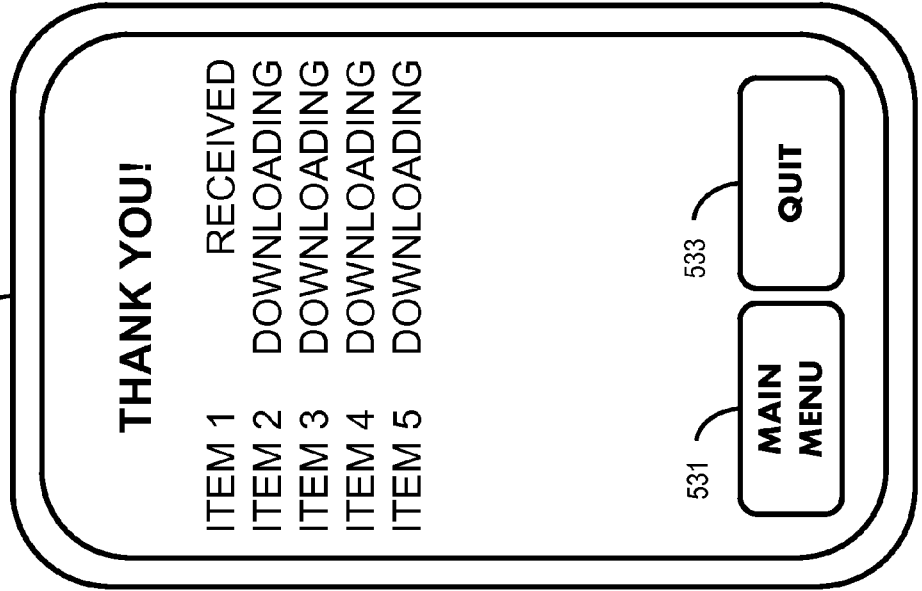
FIGS. 5A-5B are diagrams of user interfaces utilized in the processes of FIG. 3, according to various embodiments.
Figure 5A:
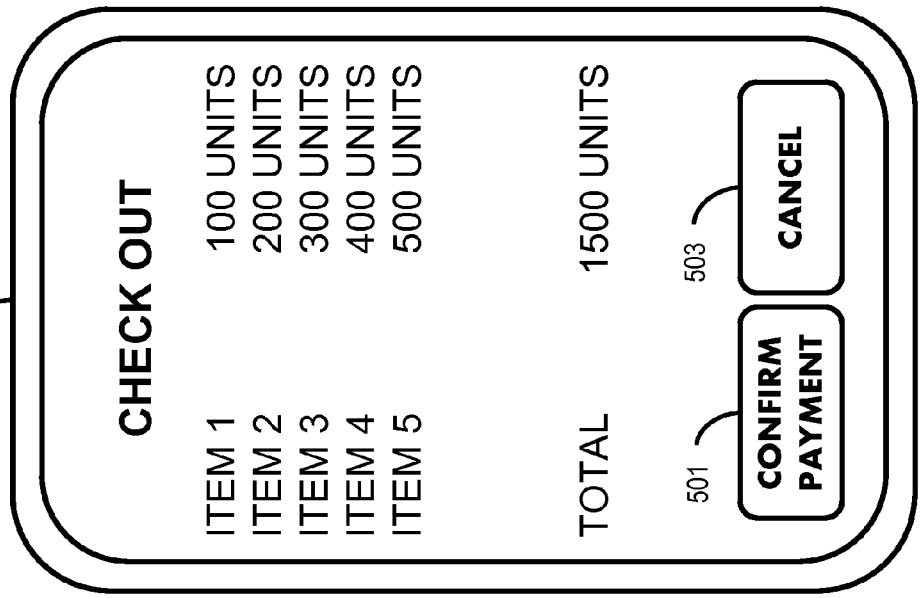

FIGS. 5A-5B are diagrams of user interfaces utilized in the processes of FIG. 3, according to various embodiments. FIG. 5A illustrates a user interface 500 that features a check out window along with buttons 501 and 503 (e.g., "Confirm Payment", "Cancel"). The check out window lists the items, the costs associated with each item, and the total cost of all the items. After reviewing the list, the user may either confirm that the user is willing to pay for the listed items by selecting the button 501 or cancel the transaction by selecting the button 503. If the user confirms the user's willingness to pay, the user interface 500 may transmit the user's payment information, for instance, to the transaction engine 103 to complete the transaction.

FIG. 5B illustrates a user interface 530 that features a thank you window along with buttons 531 and 533 (e.g., "Main Menu", "Quit"). The thank you window lists the items that were released to the user. As an example, the transaction engine 103 may have determined to initiate the delivery of the items prior to receiving a confirmation of the payment approval from the payment service provider 113. As shown, the purchased items were downloadable content items (e.g., media content). Item 1 has been downloaded, while the other items are currently being downloaded. While the other items are being downloaded, the user has the option to go back to the main menu by selecting the button 531 or exit the user interface 530 by selecting the button 533.

Figure 6B:
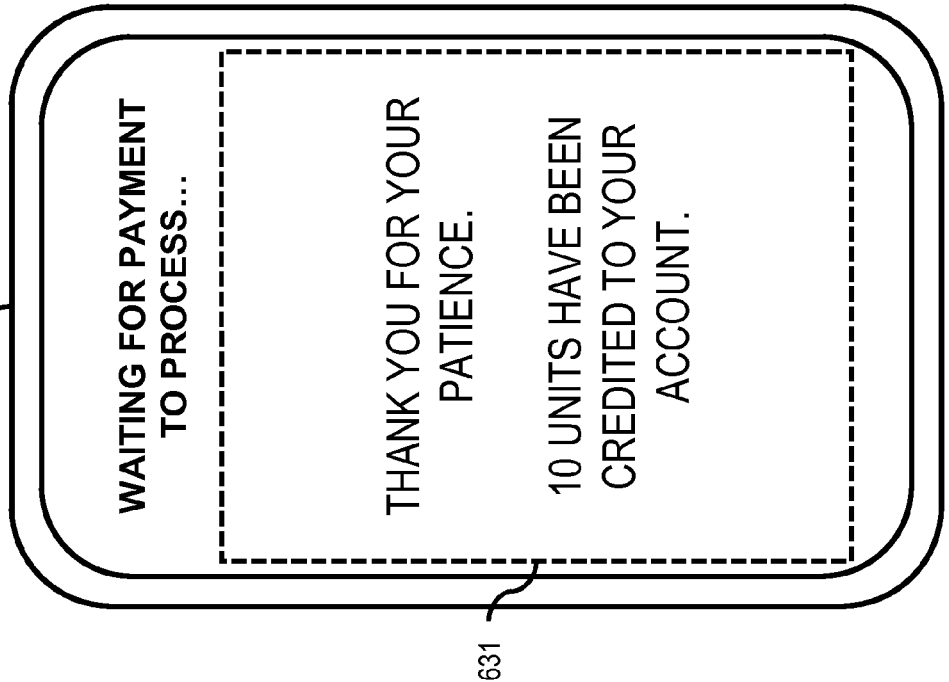
FIGS. 6A-6B are diagrams of user interfaces utilized in the processes of FIG. 4, according to various embodiments.
Figure 6A:
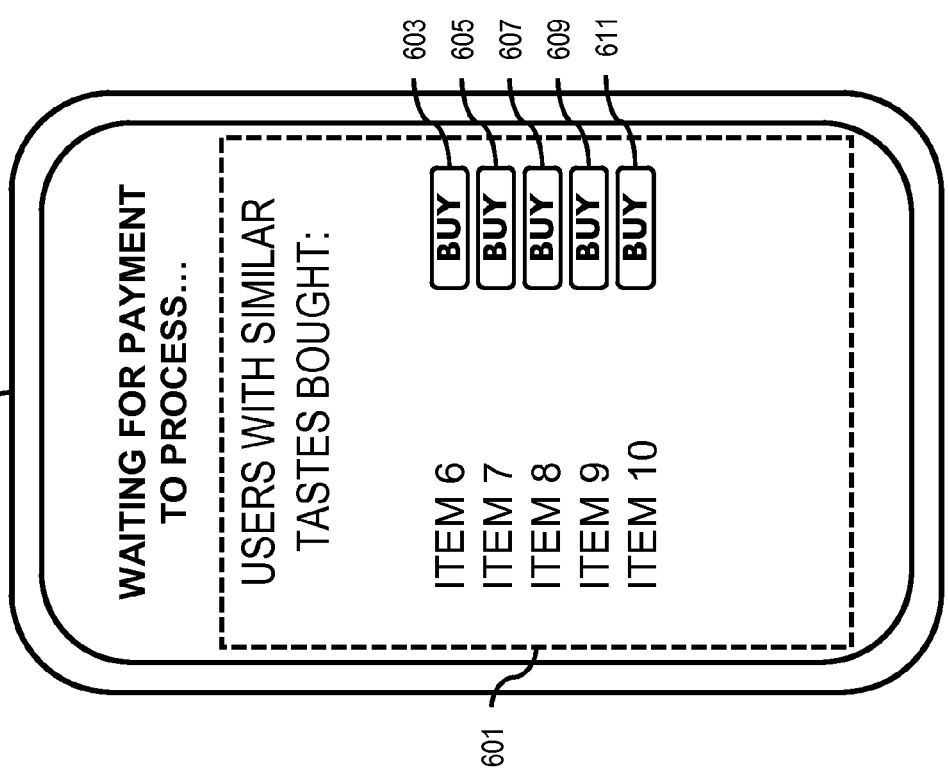

FIGS. 6A-6B are diagrams of user interfaces utilized in the processes of FIG. 4, according to various embodiments. FIG. 6A illustrates a user interface 600 that features a waiting status window along with a recommendation 601 and buttons 603, 605, 607, 609, and 611 (e.g., "Buy"). As discussed, one or more advertisements, one or more recommendations, related information, or a combination thereof may be presented to the user, for instance, while the user is waiting for the delivery of the items (e.g., pending the determination of whether to deliver the item prior to payment approval, pending the receipt of a confirmation of payment approval, etc.). Here, the recommendation 601 lists several items that have been previously purchases by other users with similar tastes as the user. The recommendation 601 also includes options (e.g., buttons 603, 605, 607, 609, and 611) to purchase the recommended items.

FIG. 6B illustrates a user interface 630 that features a waiting status window along with a notification 631. As mentioned, a time duration associated with the determination of whether to deliver the item prior to payment approval, the receipt of the confirmation of payment approval, etc., may be determined to exceed a predetermined threshold. Here, it has been determined that the time duration exceeds the predetermined threshold. As such, the user's profile has been modified such that the user's profile is supplemented with additional payment credits that may, for instance, be used to purchase items in any subsequent transactions. Accordingly, the user is notified, via the notification 631, of the additional payment credits that have been added to the user's profile (e.g., 10 units).

The processes described herein for providing asynchronous payment processing may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
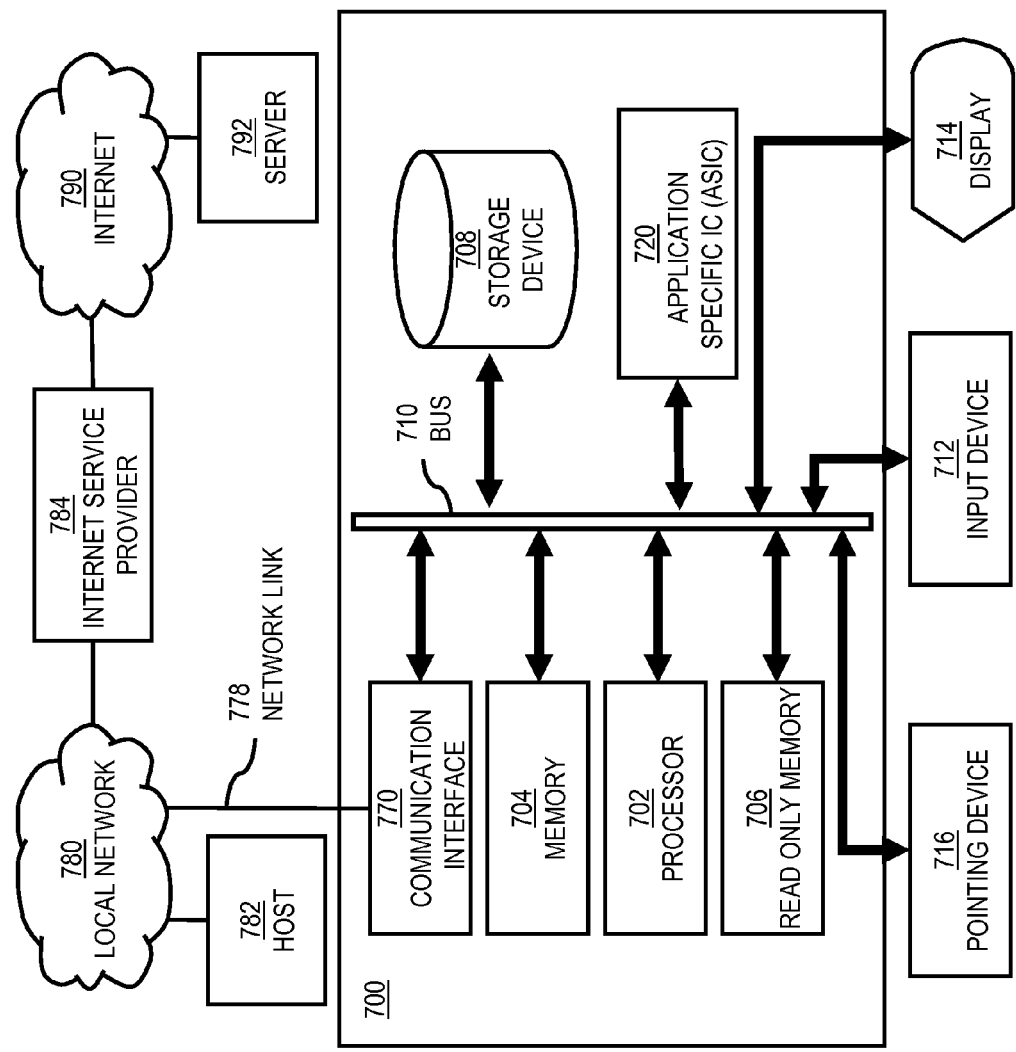
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide asynchronous payment processing as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing asynchronous payment processing.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing asynchronous payment processing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing asynchronous payment processing. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing asynchronous payment processing, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing asynchronous payment processing to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide asynchronous payment processing as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing asynchronous payment processing.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide asynchronous payment processing The memory 805 also stores the data associated with or generated by the execution of the inventive steps.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing asynchronous payment processing. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing asynchronous payment processing. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide asynchronous payment processing. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   receiving, by a processor, payment information, from a device, for completing a transaction between a first party and a second party, wherein the payment information is for requesting, at least in part, a payment approval from at least one payment service provider;
   at least one determination, by the processor, of historical transaction data associated with one or more previous transactions between the first party and the second party;
   a processing of the historical transaction data to determine whether to initiate a delivery of at least one item associated with the transaction prior to receiving a confirmation of the payment approval from the at least one payment service provider; and
   at least one determination, by the processor, of context information indicating a location of the device, wherein the determination to initiate the delivery of the at least one item prior to receiving the confirmation of the payment approval is based, at least in part, on the context information.

2. A method of claim 1, wherein the (1) data and/or (2) information and/or (3) at least one signal are further based, at least in part, on the following:
   at least one determination that there is negative payment information in the historical transaction data; and
   at least one determination to hold the delivery of the at least one item until the confirmation of the payment approval is received from the at least one payment service provider.

3. A method of claim 2, wherein the negative payment information includes, at least in part, a failed status of one or more previous payment approval requests, a waiting status of the one or more previous payment approval requests, or a combination thereof.

4. A method of claim 2, wherein the (1) data and/or (2) information and/or (3) at least one signal are further based, at least in part, on the following:
   at least one determination of an age of the negative payment information,
   wherein the determination to hold the delivery of the at least one item is further, based, at least in part, on the age.

5. A method of claim 1, wherein the (1) data and/or (2) information and/or (3) at least one signal are further based, at least in part, on the following:
   at least one determination that there is no historical transaction data between the first party and the second party; and
   at least one initiation of the delivery of the at least one item prior to receiving the confirmation of the payment approval.

6. A method of claim 1, wherein the (1) data and/or (2) information and/or (3) at least one signal are further based, at least in part, on the following:
   at least one determination to present one or more advertisements, one or more recommendations, related information, or a combination thereof pending the determination of whether to initiate the delivery of the at least one item, the receiving of the confirmation of the payment approval, or a combination thereof.

7. A method of claim 1, wherein the (1) data and/or (2) information and/or (3) at least one signal are further based, at least in part, on the following:
   at least one determination of a time duration associated with the determination of whether to initiate the delivery of the at least one item, the receiving of the confirmation of the payment approval, or a combination thereof;
   at least one determination that the time duration exceeds a predetermined threshold; and
   at least one modification of the transaction, one or more subsequent transactions, or a combination thereof to include discount information, one or more payment credits, or a combination thereof in profile information associated with the first party, the second party, or a combination thereof.

8. A method of claim 1, wherein the (1) data and/or (2) information and/or (3) at least one signal are further based, at least in part, on the following:
   a processing of the payment information to determine one or more payment types,
   wherein the determination to initiate the delivery of the at least one item prior to receiving the confirmation of the payment approval is based, at least in part, on the one or more payment types, one or more characteristics associated with the one or more payment types, or a combination thereof.

9. A method of claim 8, wherein the one or more characteristics associated with the payment types include, at least in part, an approval processing speed, a rate of fraud, or a combination thereof.

10. A method of claim 1, wherein the (1) data and/or (2) information and/or (3) at least one signal are further based, at least in part, on the following:
    a processing, by the processor, of the context information to determine a country for the device, wherein the determination to initiate the delivery of the at least one item prior to receiving the confirmation of the payment approval is based, at least in part, on the country.

11. An apparatus comprising:
    at least one processor; and
    at least one memory including computer program code for one or more programs, the at least one memory and the computer program code configured to, with the at least one processor, cause the apparatus to perform at least the following, receive payment information, from a device, for completing a transaction between a first party and a second party, wherein the payment information is for requesting, at least in part, a payment approval from at least one payment service provider;

determine historical transaction data associated with one or more previous transactions between the first party and the second party; and process and/or facilitate a processing of the historical transaction data to determine whether to initiate a delivery of at least one item associated with the transaction prior to receiving a confirmation of the payment approval from the at least one payment service provider; and determine context information indicating a location of the device, wherein the determination to initiate the delivery of the at least one item prior to receiving the confirmation of the payment approval is based, at least in part, on the context information.

12. An apparatus of claim 11, wherein the apparatus is further caused to:

determine that there is negative payment information in the historical transaction data; and determine to hold the delivery of the at least one item until the confirmation of the payment approval is received from the at least one payment service provider.

13. An apparatus of claim 12, wherein the negative payment information includes, at least in part, a failed status of one or more previous payment approval requests, a waiting status of the one or more previous payment approval requests, or a combination thereof.

14. An apparatus of claim 12, wherein the apparatus is further caused to:

determine an age of the negative payment information, wherein the determination to hold the delivery of the at least one item is further, based, at least in part, on the age.

15. An apparatus of claim 11, wherein the apparatus is further caused to:

determine that there is no historical transaction data between the first party and the second party; and cause, at least in part, initiation of the delivery of the at least one item prior to receiving the confirmation of the payment approval.

16. An apparatus of claim 11, wherein the apparatus is further caused to:

determine to present one or more advertisements, one or more recommendations, related information, or a combination thereof pending the determination of whether to initiate the delivery of the at least one item, the receiving of the confirmation of the payment approval, or a combination thereof.

17. An apparatus of claim 11, wherein the apparatus is further caused to:

determine a time duration associated with the determination of whether to initiate the delivery of the at least one item, the receiving of the confirmation of the payment approval, or a combination thereof;

determine that the time duration exceeds a predetermined threshold; and cause, at least in part, modification of the transaction, one or more subsequent transactions, or a combination thereof to include discount information, one or more payment credits, or a combination thereof in profile information associated with the first party, the second party, or a combination thereof.

18. An apparatus of claim 11, wherein the apparatus is further caused to:

process and/or facilitate a processing of the payment information to determine one or more payment types, wherein the determination to initiate the delivery of the at least one item prior to receiving the confirmation of the payment approval is based, at least in part, on the one or more payment types, one or more characteristics associated with the one or more payment types, or a combination thereof.

19. An apparatus of claim 18, wherein the one or more characteristics associated with the payment types include, at least in part, an approval processing speed, a rate of fraud, or a combination thereof.

20. An apparatus of claim 11, wherein the apparatus is further caused to:

process and/or facilitate a processing of the context information to determine a country for the device, wherein the determination to initiate the delivery of the at least one item prior to receiving the confirmation of the payment approval is based, at least in part, on the country.

* * * * *